(12) United States Patent
Biber et al.

(10) Patent No.: US 9,380,742 B2
(45) Date of Patent: Jul. 5, 2016

(54) AUTONOMOUS IMPLEMENT

(71) Applicant: Robert Bosch GmbH, Stuttgart (DE)

(72) Inventors: Peter Biber, Poltringen (DE); Steffen Petereit, Freiberg A. N. (DE); Christoph Koch, Stuttgart (DE); Amos Albert, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 14/371,019

(22) PCT Filed: Nov. 20, 2012

(86) PCT No.: PCT/EP2012/073023
§ 371 (c)(1),
(2) Date: Jul. 8, 2014

(87) PCT Pub. No.: WO2013/104455
PCT Pub. Date: Jul. 18, 2013

(65) Prior Publication Data
US 2014/0371975 A1    Dec. 18, 2014

(30) Foreign Application Priority Data

Jan. 13, 2012 (DE) .......................... 10 2012 200 445

(51) Int. Cl.
*A01D 34/00* (2006.01)
*G05D 1/02* (2006.01)
(Continued)

(52) U.S. Cl.
CPC .............. *A01D 34/008* (2013.01); *B60L 1/003* (2013.01); *B60L 3/106* (2013.01); *B60L 11/1805* (2013.01); *B60L 11/1877* (2013.01);
(Continued)

(58) Field of Classification Search
CPC ... A01D 34/008; G05D 1/028; G05D 1/0265; A47L 5/14
USPC ............................................. 701/23; 700/258
See application file for complete search history.

(56) References Cited

U.S. PATENT DOCUMENTS

| | | | | |
|---|---|---|---|---|
| 5,204,814 A | * | 4/1993 | Noonan | A01D 34/008 180/168 |
| 7,388,343 B2 | * | 6/2008 | Jones | G05D 1/0219 318/568.12 |

(Continued)

FOREIGN PATENT DOCUMENTS

| | | |
|---|---|---|
| DE | 10 2008 011 947 A1 | 9/2009 |
| WO | 2006/087542 A1 | 8/2006 |

OTHER PUBLICATIONS

International Search Report corresponding to PCT Application No. PCT/EP2012/073023, mailed Feb. 15, 2013 (German and English language document) (8 pages).

*Primary Examiner* — Thomas G Black
*Assistant Examiner* — Wae Louie
(74) *Attorney, Agent, or Firm* — Maginot, Moore & Beck LLP

(57) ABSTRACT

An autonomous implement comprising at least one drive unit including at least one drive wheel, at least one sensor unit configured to detect at least one characteristic value, at least one location-determining unit configured to detect at least one characteristic value, and at least one evaluating unit. The at least one evaluating unit is configured to determine a slip of the at least one drive wheel from the at least one characteristic value detected by the at least one sensor unit and the at least one characteristic value detected by the at least one location-determining unit.

9 Claims, 2 Drawing Sheets

(51) Int. Cl.
*B60L 1/00* (2006.01)
*B60L 3/10* (2006.01)
*B60L 11/18* (2006.01)
*B60L 15/20* (2006.01)

(52) U.S. Cl.
CPC ......... *B60L 15/2036* (2013.01); *G05D 1/027* (2013.01); *G05D 1/0272* (2013.01); *B60L 2200/40* (2013.01); *B60L 2220/44* (2013.01); *B60L 2240/12* (2013.01); *B60L 2240/22* (2013.01); *B60L 2240/421* (2013.01); *B60L 2240/423* (2013.01); *B60L 2240/465* (2013.01); *B60L 2260/32* (2013.01); *G05D 2201/0203* (2013.01); *G05D 2201/0208* (2013.01); *Y02T 10/645* (2013.01); *Y02T 10/7005* (2013.01); *Y02T 10/705* (2013.01); *Y02T 10/72* (2013.01); *Y02T 10/7275* (2013.01)

(56) References Cited

U.S. PATENT DOCUMENTS

| | | | | |
|---|---|---|---|---|
| 8,634,960 | B2* | 1/2014 | Sandin | G05D 1/028 56/10.2 E |
| 8,918,213 | B2* | 12/2014 | Rosenstein | B25J 5/007 700/245 |
| 8,954,193 | B2* | 2/2015 | Sandin | G05D 1/028 700/245 |
| 2003/0023356 | A1* | 1/2003 | Keable | G05D 1/0219 701/23 |
| 2010/0174409 | A1* | 7/2010 | Park | G05D 1/0246 700/259 |
| 2012/0265391 | A1* | 10/2012 | Letsky | A01D 34/008 701/25 |
| 2014/0371975 | A1* | 12/2014 | Biber | A01D 34/008 701/23 |

* cited by examiner

AUTONOMOUS IMPLEMENT

This application is a 35 U.S.C. §371 National Stage Application of PCT/EP2012/073023, filed on Nov. 20, 2012, which claims the benefit of priority to Serial No. DE 10 2012 200 445.9, filed on Jan. 13, 2012 in Germany, the disclosures of which are incorporated herein by reference in their entirety.

BACKGROUND

An autonomous implement, in particular an autonomous lawnmower, is already known from DE 10 2008 011 947 A1, wherein said autonomous implement comprises a drive unit that comprises a drive wheel and said autonomous implement comprises a sensor unit, a location-determining unit and an evaluating unit.

SUMMARY

The disclosure is based on an autonomous implement, in particular on an autonomous lawn mower, having at least one drive unit that comprises at least one drive wheel and said autonomous implement having at least one sensor unit, at least one location-determining unit and at least one evaluating unit.

It is proposed that the evaluating unit is provided for the purpose of taking into account at least one characteristic value that is detected by the sensor unit and at least one characteristic value that is detected by the location-determining unit in order to ascertain the slip of the at least one drive wheel. The term "autonomous implement" is to be understood to mean in particular an implement that performs a task at least in part independently such as in particular beginning independently, terminating independently and/or independently selecting at least one parameter such as in particular a distance parameter, and/or a turning point etc. It is particularly preferred that the device is provided for the purpose of traversing a surface and in particular to process the surface such as by way of example to sweep, to vacuum, to clean and/or to mow grass that is located on the surface. Different autonomous implements that appear expedient to the person skilled in the art, such as by way of example an autonomous sweeping machine, an autonomous vacuum cleaner or an autonomous swimming pool cleaning machine etc., are feasible. The autonomous implement that is formed by an autonomous lawnmower is particularly preferred.

The term "drive unit" is to be understood in this case in particular to mean a unit that is provided to move the autonomous implement forwards. It is preferred that the drive unit comprises an electrical, mechanical and/or pneumatic motor unit that is provided for the purpose of advantageously generating a rotational movement of the drive wheel during an operation. It is particularly preferred that the motor unit is embodied as an electric motor. Furthermore, in this context the term "drive wheel" is in particular to be understood to mean a wheel that is at least in part directly or indirectly connected to the motor unit in a non-positive locking manner. The drive unit is preferably embodied as a differential drive unit. The differential drive unit preferably comprises two motor units and two drive wheels, wherein in each case a motor unit is allocated to a drive wheel. However, it is also feasible that the drive unit comprises another embodiment that appears expedient to the person skilled in the art, such as by way of example an embodiment as a rigid axle drive unit in which two drive wheels are driven by means of a rigid axle that is driven by means of the motor unit, or an embodiment as a differential gear drive unit in which two drive wheels are driven by way of a differential gear drive unit that is driven by the motor unit, etc. In the case of the embodiment of the drive unit as a differential gear drive unit, the autonomous implement is preferably decoupled from an active steering unit that comprises at least one steering wheel that is mounted in an articulated manner. A change in direction in the case of a movement of the autonomous implement is preferably performed by means of a process of controlling the individual motor units that are allocated in each case to at least one of the drive wheels.

The term "sensor unit" in this context is to be understood in particular as a unit that is provided for the purpose of receiving at least one characteristic value and/or a physical characteristic, wherein the process of receiving can take place in an active manner, such as in particular by means of generating and transmitting an electrical measuring signal, and/or in a passive manner such as in particular by means of detecting characteristic changes of a sensor component. Different sensor units that appear expedient to a person skilled in the art are feasible. The term "location-determining unit" in particular is to be defined as a unit that is provided for the purpose of determining a location, in particular a global location, of the autonomous implement as a consequence of detecting at least one characteristic value. It is particularly preferred that the location-determining unit is embodied as a satellite navigation location-determining unit, in particular as a GPS receiver or as a Galileo receiver. However, it is also feasible that the location-determining unit is embodied as a magnetic compass and/or as a polarization filter compass etc. The term "evaluating unit" is to be understood in this context to mean in particular a unit having an information input, an information processing unit and an information output. The evaluating unit advantageously comprises at least one processor, a storage medium, an operating program, regulating routines, control routines, and/or calculating routines. It is particularly preferable that the information input is connected to a sensor element of the sensor unit or is formed from a sensor element of the sensor unit.

The term "slip of a drive wheel" is to be understood in particular as a ratio of a difference between a maximum traversable roll-out distance of the drive wheel on a ground during one rotation of the drive wheel and during an operation an actual maximum traversed roll-out distance, influenced by influencing factors, of the drive wheel on the ground during a rotation of the drive wheel during an operation compared to the maximum traversable roll-out distance of the drive wheel; and/or the term "slip of a drive wheel" is in particular to be understood to mean a measurement for determining a sliding friction between the drive wheel and a ground on which the drive wheel is arranged. The maximum traversable roll-out distance of the drive wheel is considered in particular during a rotation along an angular region of 360° about an axis of rotation of the drive wheel in an at least essentially non-deformed state of the drive wheel, wherein the rotation of the drive wheel is at least essentially decoupled from a sliding friction. The influencing factors of the maximum roll-out distance actually traveled during an operation by the drive wheel during a rotation along an angular region of 360° about the axis of rotation of the drive wheel can be in this case by way of example sliding friction, deformation of the drive wheel etc. As a consequence, in the case of a rotation of the drive wheel, in particular in the case of the autonomous implement coming to a standstill, during a drive operation of the drive wheel or in the case of the drive wheel becoming blocked during a braking operation, a slip of 100% is present. The term "a slip of a drive wheel" can therefore be understood to mean a ratio of a maximum possible traction of the drive wheel on a ground during a rotational movement compared to a traction actually present during an operation of the drive wheel on the ground during the rotational movement. The evaluating unit uses algorithms that are previously known to a person skilled in the art for a combination of data, such as by way of example Kalman filtering etc. for the purpose of determining the slip of the drive wheel. All the detected characteristic values for the purpose of determining the slip of the drive wheel by means of the evaluating unit can be present in different sampling steps or in identical sampling steps and the detected characteristic values can occur in an equidistant or non-equidistant manner. Furthermore, the evaluating unit is particularly preferably provided for the purpose of, in addition to the process of determining the slip of the drive wheel, determining at least a slip of a further drive wheel of the drive unit and said drive wheel can be driven by means of a further motor unit of the drive unit. The evaluating unit preferably likewise takes into account at least one characteristic value that is detected by the sensor unit and at least one characteristic value that is detected by the location-determining unit. A slip can be advantageously determined by means of the embodiment of the autonomous implement in accordance with the disclosure and said slip can be used in an advantageous manner to optimize a driving behavior of the autonomous implement, in particular to optimize an odometry. Furthermore, it is possible to achieve advantageous propulsion. Furthermore, it is possible by means of the process in accordance with the disclosure of determining the slip of the drive wheel to derive in an advantageous manner ground qualities of a ground on which the autonomous implement is moving. It is possible, by way of example in dependence upon a magnitude of a value of the slip, to determine whether a ground is moist or rather slippery or whether the autonomous implement is immobile since the drive wheel is constantly turning. In the case of determining an immobility of the autonomous implement, it is feasible to take into account further characteristics that appear expedient to a person skilled in the art, by way of example a current and/or voltage characteristic of the motor unit. As a consequence, it is possible in an advantageous manner to achieve an optimization of an odometry of the autonomous implement. Furthermore, it is possible in an advantageous manner to use the process of determining the slip of the drive wheel to identify the state by way of example a process of recognizing an abrasion or rather wear and tear of the drive wheel or play in the gears, wherein this identification process can be used in an advantageous manner in order to correct tracking or to output a maintenance signal.

Furthermore, it is proposed that the evaluating unit is provided for the purpose of taking into account at least one characteristic value that is detected by the sensor unit and said characteristic value is embodied as a rotational speed value and/or as a torque value. Furthermore, it is likewise feasible that the evaluating unit additionally or alternatively takes into account at least one characteristic value that is detected by the sensor unit and is embodied as a velocity value such as by way of example an angular velocity, a tangential velocity etc. Furthermore, it is also feasible that the evaluating unit takes into account additionally or alternatively at least one characteristic value of the motor unit that is detected by means of the sensor unit and is embodied as a current value and/or a voltage value. This can render possible a constructively simple process of detecting a characteristic value for the purpose of determining the slip of the drive wheel.

The evaluating unit is furthermore advantageously provided for the purpose of taking into account in the case of determining the slip at least one characteristic value that is detected by means of the location-determining unit and is embodied as velocity. The location-determining unit determines the velocity preferably by way of a measurement of a Doppler effect or by way of a measurement of a numerical differentiation of the location with respect to time. However, it is also feasible that the location-determining unit measures or rather detects the velocity by means of another method and manner that appears expedient to a person skilled in the art. Furthermore, it is possible to determine a movement direction of the autonomous implement by means of the location-determining unit and said movement direction can also be used as an artificial compass or for the purpose of aligning electronic maps that are stored in the evaluating unit. A process of determining the movement direction is based in this case preferably likewise on the Doppler Effect. Furthermore, it is feasible that in the case of determining a slip of the drive wheel the evaluating unit takes into account further characteristic values that are determined by the location-determining unit. The slip of the drive wheel can advantageously be determined in a precise manner by means of the embodiment in accordance with the disclosure and said process of determining the slip is achieved in a manner that is particularly preferred with respect to optimizing a navigation of the autonomous implement.

Furthermore, the evaluating unit is advantageously provided for the purpose of determining the slip of the drive wheel for the purpose of taking into account at least one characteristic value that is detected by means of the sensor unit and is embodied as the rate of rotation. In this case, the sensor unit comprises at least one rotation rate sensor for the purpose of detecting a rate of rotation, in particular a rate of rotation of the drive wheel. However, it is also feasible that the sensor unit detects other characteristic values that appear expedient to a person skilled in the art and said characteristic values are taken into account by the evaluating unit for the purpose of determining the slip of the drive wheel, such as by way of example a velocity (angular rate, rotational velocity etc.), a rotational speed, an operating state etc. It is possible to precisely determine the slip of the drive wheel in a particularly advantageous manner by means of the embodiment in accordance with the disclosure.

It is particularly preferred that the sensor unit comprises at least one inertial sensor unit. The term "inertial sensor unit" is to be understood to mean in particular a sensor unit that comprises at least one rotational speed sensor and an acceleration sensor. The inertial sensor unit preferably comprises at least three rotational speed sensors and three acceleration sensors. However, it is also feasible that the inertial sensor unit comprises one of three differing number of rotational speed sensors and acceleration sensors. In particular, in each case a rotational speed sensor and an acceleration sensor are allocated in each case to one of three coordinate axes. The coordinate axes are preferably arranged in an orthogonal manner to one another. It is possible by means of the embodiment in accordance with the disclosure to advantageously detect acceleration values along at least one axis and to detect angular values of the autonomous implement about at least one axis, in order for said values to be taken into account in the case of determining the slip of the drive wheel by means of the evaluating unit.

Furthermore, it is proposed that the autonomous implement comprises at least one housing unit, wherein the evaluating unit is at least provided for the purpose of determining at least one tilt of the housing unit about at least one axis that is different to a vertical axis as a consequence of at least one of the characteristic values that are detected by the sensor unit. The axis that is different to the vertical axis of the housing unit extends preferably at least essentially perpendicular to the vertical axis. The expression "essentially perpendicular" is to be defined in this case in particular as an orientation of a direction relative to a reference direction, wherein the direction and the reference direction, in particular considered in a plane, include an angle of 90° and the angle comprises a maximum deviation of in particular less than 8°, advantageously less than 5° and particularly advantageously less than 2°. Furthermore, at least one further characteristic value of a further axis that is different from the vertical axis of the housing unit is detected by means of the sensor unit for the purpose of determining by means of the evaluating unit. The further axis extends at least essentially perpendicular to the vertical axis and at least essentially perpendicular to the axis that is different to the vertical axis of the housing unit. As a consequence, the vertical axis, the axis that is different to the vertical axis of the housing unit and the further axis that is different to the vertical axis of the housing unit preferably form a Cartesian coordinate system. The axis that is different from the vertical axis of the housing unit and the further axis that is different from the vertical axis of the housing unit extend in a plane that extends at least essentially parallel to a surface plane of a ground on which the autonomous implement can be operated in a properly conducted operation or on which the autonomous implement can be packed with its drive wheel or rather with its drive wheels and/or with its support wheels. The surface plane of the ground is formed in particular by means of a convergence of maximum values of the ground. The term "essentially parallel" is in particular to be understood to mean an orientation of a direction relative to a reference direction, in particular in a plane, wherein the direction comprises a deviation in particular less than 8°, advantageously less than 5° and particularly advantageously less than 2° with respect to the reference direction. It is then possible to advantageously detect an angle of inclination by means of the embodiment in accordance with the disclosure. As a consequence, it is advantageously possible to determine a position of the autonomous implement on sloping terrain or rather it is possible to take into account the position of the autonomous implement on sloping terrain in the case of determining a driving strategy whilst working on a surface by means of the autonomous implement. It is advantageously possible to traverse in an efficient manner a surface that is to be processed.

It is particularly preferred that the autonomous implement comprises at least the housing unit, wherein the evaluating unit is provided for the purpose of determining at least one characteristic value of a different lateral movement of the housing unit with respect to a forwards movement. It is preferred that the forward movement extends along the axis that is different to the vertical axis of the housing unit. Furthermore, the lateral movement preferably extends along the further different axis with respect to the vertical axis of the housing unit. It is particularly preferred that the lateral movement comprises at least one moving component that is embodied at least essentially parallel to an axis of rotation of the drive wheel, in particular in the case of a fixed axis that is embodied decoupled from a rotational movement about an axis that extends at least essentially perpendicular to the axis of rotation. It is particularly preferred that the evaluating unit is provided for the purpose of determining at least one characteristic value of the housing unit that is embodied as a lateral velocity. As a consequence, a lateral acceleration of the autonomous implement can be advantageously determined, in particular when moving in a transverse manner with respect to a slope. As a consequence, an adjustment of a driving behavior can be rendered advantageously possible when the autonomous implement is moving on sloping terrain.

The evaluating unit is advantageously provided for the purpose of taking into account at least the determined slip of the drive wheel and the tilt of the housing unit for the purpose of determining the characteristic value of the lateral movement. It is preferred that the evaluating unit is provided for the purpose of taking into account at least the slip of the drive wheel and the determined tilt of the housing unit for determining a lateral velocity of the housing unit. However, it is also feasible that the evaluating unit takes into account further characteristic values that appear expedient to a person skilled in the art for the purpose of determining the lateral velocity of the housing unit, such as by way of example a drive wheel geometry, a state of the autonomous implement etc. Furthermore, in an alternative embodiment of the autonomous implement it is feasible that the evaluating unit is decoupled from a process of determining the slip and is only provided for the purpose of determining a lateral velocity of the housing unit. In this case, it is possible by way of example that a roll angle of the autonomous implement, a velocity of the drive wheel, a drive wheel geometry, a state of the autonomous implement and a ground characteristic is taken into account by the evaluating unit for the purpose of determining the lateral velocity.

Furthermore, it is proposed that the autonomous implement comprises at least one control and/or regulating unit that is provided for the purpose of taking into account data that is determined by the evaluating unit to determine and/or adjust a drive strategy. The term "control and/or regulating unit" is to be understood in particular to mean a unit that comprises at least one processor unit, at least one storage unit and also an operating program that is stored in the storage unit. The control and/or regulating unit is preferably provided for the purpose of actively changing a driving behavior of the autonomous implement in dependence upon data that is determined by the evaluating unit or rather to adjust to new incidents with reference to the data that is determined by means of the evaluating unit. It is furthermore feasible that the control and/or regulating unit adjusts or rather changes a rotational speed of the drive wheel and/or a torque of the motor unit as a consequence of a value of the slip of the drive wheel. Advantageously, it is possible to achieve an efficient driving strategy for the purpose of traversing a surface that is to be processed. Furthermore, in the case of an embodiment of the autonomous implement as an autonomous lawnmower, a clean cutting pattern and short cutting period can be advantageously achieved. Furthermore, in the case of an embodiment of the autonomous implement as an autonomous lawnmower, multiple crossings of the surface that is to be processed and is embodied as grass can be advantageously achieved and this advantageously protects the grass. Furthermore, expensive and technically complex landmarks can be avoided that furthermore negatively influence an aesthetic appearance of a working area, in particular of the grass.

Furthermore, the disclosure relates to an evaluating unit for an autonomous implement in accordance with the disclosure. As a consequence, it is also possible in a particularly advantageous manner to retrospectively equip previously existing autonomous implements with an evaluating device in order to achieve the above mentioned advantages.

Furthermore, the disclosure relates to a method for an autonomous implement in accordance with the disclosure and said method is provided for the purpose of determining the slip of at least the drive wheel of the drive unit. In this case, at least one characteristic value that is detected by the sensor unit and at least one characteristic value that is detected by the location-determining unit are taken into account. As a consequence, the autonomous implement can be controlled in a precise manner.

The autonomous implement in accordance with the disclosure and/or the evaluating unit in accordance with the disclosure is/are not to be limited in this case to the above described application and embodiment. In particular, for the purpose of fulfilling a method of functioning described herein, the autonomous implement in accordance with the disclosure and/or the evaluating unit in accordance with the disclosure can comprise a number that differs from the number mentioned herein of individual elements, components and units.

BRIEF DESCRIPTION OF THE DRAWINGS

Further advantages are evident in the following description of the drawing. An exemplary embodiment of the disclosure is illustrated in the drawings. The drawings, the description and the claims include numerous features in combination. The person skilled in the art will also expediently consider the features individually and will make further expedient combinations.

In the drawings.

DETAILED DESCRIPTION

Figure 1:
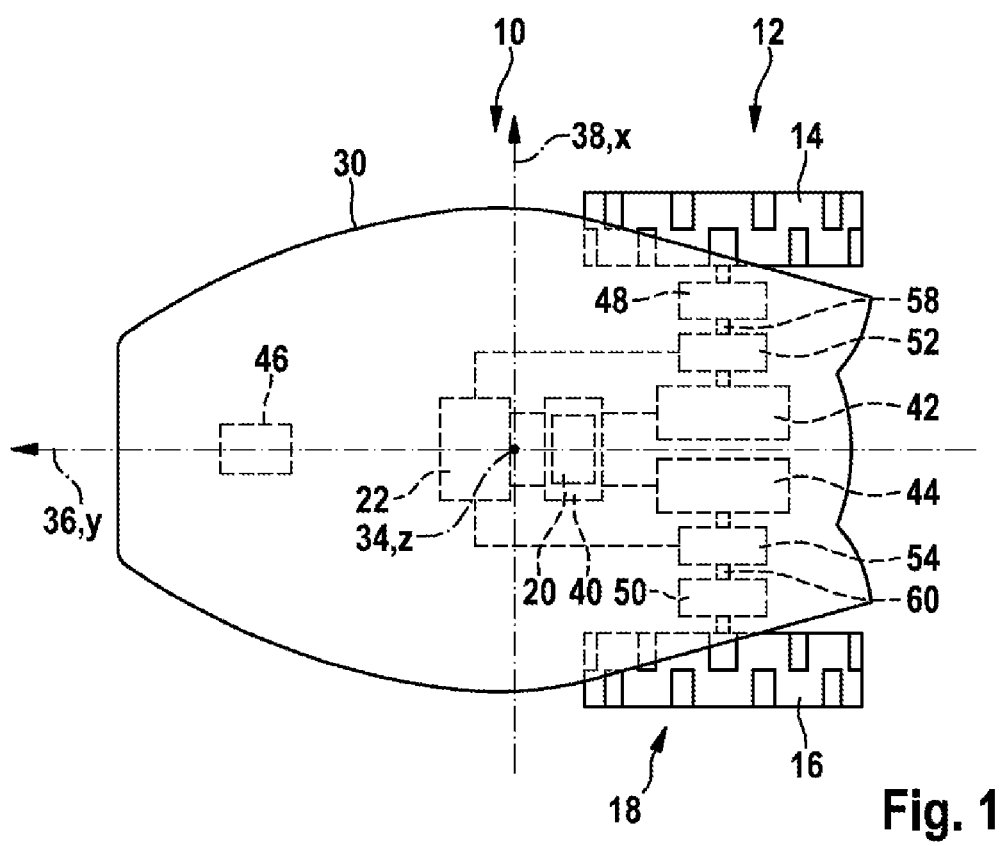
FIG. 1 illustrates an autonomous implement in accordance with the disclosure in a schematic illustration.

FIG. 1 illustrates an autonomous implement 10 that is formed from an autonomous lawnmower that comprises at least one mower (not illustrated here) that is previously known to the person skilled in the art. The autonomous implement 10 comprises at least one drive unit 12 that comprises at least one drive wheel 14, at least one sensor unit 18, at least one location determining unit 20 and at least one evaluating unit 22. The evaluating unit 22 is provided for the purpose of taking into account at least one of the characteristic values 24, 28, 32 that are detected by the sensor unit 18 and at least one of the characteristic values 26 that are detected by the location-determining unit 20 for the purpose of determining a slip of the at least one drive wheel 14. The drive unit 12 comprises a motor unit 42 that is provided for the purpose of driving the drive wheel 14. Furthermore, the drive unit 12 comprises a further motor unit 44 that is provided for the purpose of driving a further drive wheel 16 of the drive unit 12. The motor unit 42 and the further motor unit 44 are embodied as electric motors. Furthermore, the motor unit 42 and the further motor unit 44 can be controlled separately from one another by means of a control and/or regulating unit 40 of the autonomous implement 10. As a consequence, the drive unit 12 forms a differential drive unit. A steering function is in this case achieved by means of a rotational speed difference between the drive wheel 14 and the further drive wheel 16 in a manner that is previously known to a person skilled in the art.

The motor unit 42 and the further motor unit 44 are arranged within the housing unit 30 of the autonomous implement 10. In this case, the motor unit 42 and the further motor unit 44 are connected in each case by way of a shaft assembly 58, 60 of the drive unit 12 to the drive wheel 14 or rather to the further drive wheel 16, wherein in each case one of two step up/step down transmission units 48, 50 of the drive unit 12 is arranged between the drive wheel 14 and the motor unit 42 or rather between the further drive wheel 16 and the further motor unit 44. However, it is also feasible that the drive wheel 14 and the further drive wheel 16 are connected in each case directly to the motor unit 42 or rather to the further motor unit 44. The drive wheel 14 and the further drive wheel 16 are in each case arranged on remote sides of the housing unit 30.

The autonomous implement 10 furthermore comprises a support wheel 46 that in addition to being mounted in a rotatable manner about an axis of rotation of the support wheel 46 is mounted in a rotatable manner about a vertical axis 34 of a housing unit 30 of the autonomous implement 10 on the housing unit 30. The axis of rotation of the support wheel 46 extends at least in an operating state at least essentially perpendicular to the vertical axis 34 of the housing unit 30. It is feasible in an alternative embodiment of the autonomous implement 10 in accordance with the disclosure that the support wheel 46 is only mounted in such a manner that it rotates about the axis of rotation of the support wheel 46 on the housing unit 30.

The evaluating unit 22 is provided for the purpose of taking into account at least in each case a characteristic value 24, 28, 32 that is detected by the sensor unit 18 and in each case at least one characteristic value 26 that is detected by the location-determining unit 20 for the purpose of determining a slip of the drive wheel 14 and the further drive wheel 16. In this case, the evaluating unit 22 is provided for the purpose of taking into account at least one characteristic value 24 that is detected by the sensor unit 18 and is embodied as the rotational speed and/or the torque of the drive wheel 14 and/or of the further drive wheel 16. As a consequence, the sensor unit 18 comprises at least two rotational speed sensor elements 52, 54. One of the two rotational speed sensor elements 52, 54 is allocated to the drive wheel 14 and one of the rotational speed sensor elements 52, 54 is allocated to the further drive wheel 16. However, it is also feasible for the purpose of detecting a rotational speed and/or a torque of the drive wheel 14 and/or of the further drive wheel 16 that the sensor unit 18 additionally or alternatively comprises two incremental encoder elements (not further illustrated here) or that a wheel velocity is detected by means of a deduction from a current and/or voltage measurement at the motor unit 42 or rather at the further motor unit 44 by means of the sensor unit 18 and said wheel velocity is taken into account by the evaluating unit 22.

Figure 2:
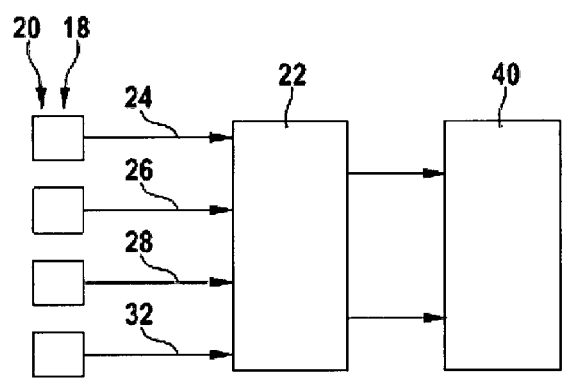
FIG. 2 illustrates a block diagram of a process of determining a slip of a drive wheel of a drive unit of the autonomous implement in accordance with the disclosure in a schematic illustration.

Furthermore, the evaluating unit 22 is provided for the purpose of taking into account at least one characteristic value 28 that is detected by the location-determining unit 20 and embodied as velocity in the case of determining the slip (FIG. 2). Furthermore, the evaluating unit 22 is provided for the purpose of taking into account at least one characteristic value 26 that is detected by the sensor unit 18 and embodied as a rotational speed. In this case, a characteristic value 26 that is embodied as a rotational speed about the vertical axis 34 of the housing 30 is detected by means of the sensor unit 18. As a consequence, the sensor unit 18 comprises at least one inertial sensor unit or rather is at least in part formed by an inertial sensor unit. The inertial sensor unit comprises at least one rotational speed sensor element (not further illustrated here) and at least one acceleration sensor element (not further illustrated here). Overall, the inertial sensor unit comprises three rotational speed sensor elements and three acceleration sensor elements. In each case, a rotational speed sensor element and an acceleration sensor element are allocated one of three coordinate axes x, y, z that are aligned orthogonally to one another in a manner that is previously known to a person skilled in the art. The vertical axis 34 of the housing unit 30 forms one of the coordinate axes x, y, z.

The evaluating unit 22 determines a slip of the drive wheel 14 and/or of the further drive wheel 16 by means of the characteristic values 24, 28, 32 that are detected by the sensor unit 18 and by means of the characteristic values 26 that are detected by the location-determining unit 20 by using an algorithm that is previously known to the person skilled in the art for the purpose of a sensor diffusion. Furthermore, it is feasible that the evaluating unit 22 takes into account, in addition to the above mentioned characteristic values 24, 26, 28, a characteristic value 32 that is embodied as the acceleration for the purpose of determining a slip of the drive wheel 14 and/or of the further drive wheel 16 (FIG. 2) and said additional characteristic value is detected by way of example by one of the three acceleration sensors of the inertial sensor unit. As a consequence, the evaluating unit 22 can determine a slip of the drive wheel 14 independently of a slip of the further drive wheel 16. Data that is determined by the evaluating unit 22 is subsequently transmitted to the control and/or regulating unit 40 by way of data lines for a process of determining the slip of the drive wheel 14 and/or of the further drive wheel 16.

The control and/or regulating unit 40 is provided for the purpose of taking into account data that is determined by the evaluating unit 22 for the purpose of determining and/or adjusting a driving strategy of the autonomous implement 10. The control and/or regulating unit 40 consequently actively engages in an operating program of the autonomous implement 10 in order to change a driving strategy that is previously present in the operating program. Furthermore, the control and/or regulating unit 40 is provided for the purpose of drawing conclusions about a ground characteristic, such as for example moisture, loose ground etc. based upon data that is determined by means of the evaluating unit 22. The control and/or regulating unit 40 can consequently change or rather adjust a driving maneuver that is currently being performed by the autonomous implement 10 with reference to the data that is determined by means of the evaluating unit 22, such as by way of example a cancellation of an operation owing to an immobility of the autonomous implement 10 that can be estimated by means of a prevailing slip of approx. 100% over a period of time of more than 10 s, or a return to a charging station etc.

Furthermore, the sensor unit 18 is provided for the purpose of detecting an acceleration of the autonomous implement 10 along two orthogonally arranged axes 36, 38 that extend at least essentially perpendicular to the vertical axis 34. The two axes 36, 38 are formed by two of the three coordinate axes x, y, z. The acceleration sensors of the inertial sensor unit are used for the purpose of detecting a characteristic value 56 that is embodied as the acceleration by means of the sensor unit 18. After a process of detecting a characteristic value 56 that is embodied as the acceleration by means of sensor unit 18, a process of suppressing noise is performed by means of a filter of the evaluating unit 22 (FIG. 3).

Thereupon, a static evaluation of the characteristic value 56 that is embodied as the acceleration is performed by means of the evaluating unit 22, wherein the static evaluation only comprises influences of a gravitational force whose magnitude depends upon a tilt of the housing unit 30 about one of two of the three coordinate axes x, y, z that are different with respect to the vertical axis 34 and are arranged in a common plane. A process of determining a characteristic value 62 that is embodied as a pitch angle and/or a roll angle of the housing unit 30 by means of the evaluating unit 22 is rendered possible by means of the characteristic value 56 that is embodied as acceleration and detected by means of the sensor unit 18 and a gravitational constant. As a consequence, the evaluating unit 22 is at least provided for the purpose of determining at least one of the characteristic values 32 that is detected by the sensor unit 18, at least one tilt of the housing unit 30 about at least one axis (36, 38) that is different from the vertical axis 34 of the housing unit 30. The evaluating unit 22 subsequently transmits the data that is determined to the control and/or regulating unit 40 and said data are taken into account for the purpose of compensating for a lateral slip in the case of a movement of the autonomous implement 10. The detected tilt of the region of a surface that is to be processed is thereupon saved in a non-volatile storage medium of the control and/or regulating unit 40 in order to be mapped on a virtual navigation mark that is stored in a storage medium.

Figure 3:
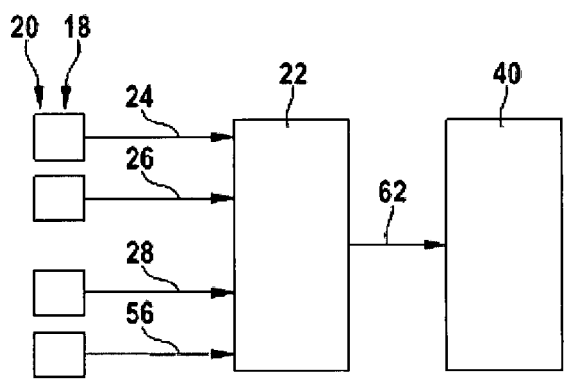
FIG. 3 illustrates a block diagram of a process of determining a lateral velocity of the autonomous implement in a schematic illustration.

Furthermore, the evaluating unit 22 is provided for the purpose of determining at least one characteristic value 56 of a lateral movement of the housing unit 30 that is different to a forwards movement (FIG. 3). The characteristic value 56 of the lateral movement that is different from the forwards movement is formed by a lateral velocity of the housing unit 30. The lateral velocity of the housing unit 30 extends at least essentially parallel to an axis of rotation of the drive wheel 14 and/or of the further drive wheel 16. The evaluating unit 22 is provided for the purpose of taking into account at least the determined slip of the drive wheel 14 and/or of the further drive wheel 16 and the tilt of the housing unit 30 for the purpose of determining the characteristic value 56 of the lateral movement. The tilt of the housing unit 30 is defined by means of a characteristic value 62 that is embodied as the roll angle of the housing unit 30. The greater the roll angle, the greater the lateral velocity of the housing unit 30. The roll angle is formed by an angle about a main movement axis of the autonomous implement 10. The main movement axis is formed by one of the axes 36, 38 that extend at least essentially perpendicular to an axis of rotation of the drive wheel 14. In the case of determining a lateral velocity of the housing unit 30, the slip that is determined by means of the evaluating unit 22 can be compared using long-term consolidated data to previously determined values of a slip from a non-volatile storage medium of the evaluating unit 22, in order as a consequence, to estimate a ground characteristic that is to be taken into account by the evaluating unit 22 in the case of determining the lateral velocity of the housing unit 30.

Furthermore, the evaluating unit 22 is provided for the purpose of determining a velocity of the drive wheel 14 and a velocity of the further drive wheel 16 by means of the rotational speed sensor elements 52, 54 of the sensor unit 18 and said velocities are taken into account for the purpose of determining the lateral velocity of the housing unit 30. An influence of the velocity of the drive wheel 14 and of the velocity of the further drive wheel 16 on lateral-guiding forces of the drive wheel 14 and the further drive wheel 16 are determined by the evaluating unit 22 using an algorithm of the evaluating unit 22 that takes into account a Kamm circle in the case of evaluating data. The greater the velocity of the drive wheel 14 and/or the velocity of the further drive wheel 16, the weaker the lateral-guiding force of the drive wheel 14 and/or of the further drive wheel 16. As a consequence, in the case of a weaker lateral-guiding force, there is a high probability of a lateral movement of the housing unit 30. Furthermore, it is feasible that the evaluating unit 12 takes into account additional or alternative characteristic values of the location-determining unit 20 for the purpose of determining a characteristic value 56 of the lateral movement of the housing unit 30 that is different to the forwards movement. The control and/or regulating unit 40 processes the data that is determined by the evaluating unit 22 that are transmitted to the control and/or regulating unit 40, in order to take into account an influence of the lateral velocity of the housing unit 30, by way of example when the autonomous implement 10 is moving in a transverse manner with respect to a slope, in the case of determining and/or adjusting a driving strategy.

Further influencing factors for the lateral velocity of the housing unit 30 are the geometry of the drive wheel 14 and of the further drive wheel 16; profiles of the drive wheel 14 and of the further drive wheel 16; abrasion on the drive wheel 14 and on the further drive wheel 16; bearing clearance in the bearing sites of the drive wheel 14 and the further drive wheel 16; an arrangement of a center of gravity of the autonomous implement 10 etc. The control and/or regulating unit 40 is provided for the purpose of taking into account the influencing factors in addition to the data that is determined by means of the evaluating unit 22 regarding the slip, the tilt and the lateral velocity in the case of determining and/or for the purpose of adjusting a driving strategy. In this case it is possible to use a physically motivated or an heuristic/experimental model that renders it possible to take the influencing factors into account by means of the control and/or regulating unit 40. As a consequence, the influencing factors and the data that is determined by means of the evaluating unit 22 regarding the slip and the tilt is taken into account in the case of determining the lateral velocity.

The invention claimed is:

1. An autonomous implement, comprising:
   at least one drive unit including at least one drive wheel;
   at least one sensor unit configured to detect at least one first characteristic value;
   at least one location-determining unit configured to detect at least one second characteristic value;
   at least one housing unit defining a vertical axis; and
   at least one evaluating unit configured to determine a slip of the at least one drive wheel from the at least one first characteristic value and the at least one second characteristic value, to determine a tilt of the at least one housing unit about a first axis that is different from the vertical axis, and to determine a third characteristic value of a lateral movement of the at least one housing unit from the determined slip of the at least one drive wheel and the determined tilt of the at least one housing unit, the lateral movement being different from a forward movement of the at least one housing unit.

2. The autonomous implement as claimed in claim 1, wherein the at least one first characteristic value is at least one of rotational speed and torque.

3. The autonomous implement as claimed in claim 1, wherein the at least one second characteristic value is velocity.

4. The autonomous implement as claimed in claim 3, wherein the at least one first characteristic value is rotational speed.

5. The autonomous implement as claimed in claim 1, wherein the at least one sensor unit is at least one inertial sensor unit.

6. The autonomous implement as claimed in claim 1, further comprising at least one control or regulating unit configured to at least one of:
   (i) determine a driving strategy based on the third characteristic value determined by the at least one evaluating unit; and
   (ii) adjust a driving strategy based on the third characteristic value determined by the at least one evaluating unit.

7. An evaluating unit for an autonomous implement including (i) at least one drive unit having at least one drive wheel, (ii) at least one sensor unit configured to detect at least one first characteristic value; (iii) at least one housing unit defining a vertical axis; and (iv) at least one location-determining unit configured to detect at least one second characteristic value, wherein:
   the evaluating unit is configured to determine a slip of the at least one drive wheel from the at least one first characteristic value and the at least one second characteristic value, to determine a tilt of the at least one housing unit about a first axis that is different from the vertical axis, and to determine a third characteristic value of a lateral movement of the at least one housing unit from the determined slip of the at least one drive wheel and the determined tilt of the at least one housing unit, the lateral movement being different from a forward movement of the at least one housing unit.

8. A method for operating an autonomous implement including (i) at least one drive unit having at least one drive wheel, (ii) at least one sensor unit, (iii) at least one housing unit, and (iv) at least one location-determining unit, comprising:
   detecting at least one first characteristic value with the at least one sensor unit;
   detecting at least one second characteristic value with the at least one location-determining unit;
   determining, with at least one evaluating unit, a slip of the at least one drive wheel of the at least one drive unit, from the at least one first characteristic value and the at least one second characteristic value;
   determining, with the at least one evaluating unit, a tilt of the at least one housing unit about a first axis that is different from a vertical axis of the at least one housing unit; and
   determining, with the at least one evaluating unit, a third characteristic value of a lateral movement of the at least one housing unit from the determined slip of the at least one drive wheel and the determined tilt of the at least one housing unit, the lateral movement being different from a forward movement of the at least one housing unit.

9. The autonomous implement as claimed in claim 1, wherein the at least one third characteristic value is a lateral velocity of the at least one housing unit.

* * * * *